(12) United States Patent
DeFrancesco

(10) Patent No.: US 7,975,499 B2
(45) Date of Patent: Jul. 12, 2011

(54) AIRCRAFT SUPPLEMENTAL COOLING SYSTEM

(75) Inventor: Gregory L. DeFrancesco, Simsbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 574 days.

(21) Appl. No.: 12/107,096

(22) Filed: Apr. 22, 2008

(65) Prior Publication Data

US 2009/0260387 A1    Oct. 22, 2009

(51) Int. Cl.
*B60H 1/32* (2006.01)
(52) U.S. Cl. ............................................ 62/239; 62/244
(58) Field of Classification Search ............ 62/239–244, 62/434–435, 332–333, 506–507, 401
See application file for complete search history.

(56) References Cited

U.S. PATENT DOCUMENTS

| | | |
|---|---|---|
| 4,462,561 A | 7/1984 | Cronin |
| 4,681,610 A | 7/1987 | Warner |
| 4,769,051 A | 9/1988 | DeFrancesco |
| 4,829,775 A | 5/1989 | DeFrancesco |
| 4,966,005 A | 10/1990 | Cowell |
| 4,993,886 A | 2/1991 | Hofstetter |
| 5,461,882 A | 10/1995 | Zywiak |
| 5,491,979 A * | 2/1996 | Kull et al. ....................... 62/185 |
| 5,513,500 A * | 5/1996 | Fischer et al. .................. 62/239 |
| 5,516,330 A | 5/1996 | Dechow |
| 5,545,084 A | 8/1996 | Fischer |
| 5,704,218 A * | 1/1998 | Christians et al. .............. 62/172 |
| 6,449,961 B1 | 9/2002 | Korsgaard |
| 6,568,203 B1 | 5/2003 | Leathers |
| 6,615,606 B2 * | 9/2003 | Zywiak .......................... 62/402 |
| 6,681,591 B2 | 1/2004 | DeFrancesco |
| 7,024,874 B2 * | 4/2006 | Zywiak et al. .................. 62/199 |
| 7,044,214 B2 | 5/2006 | Leathers |
| 7,121,100 B2 | 10/2006 | Atkey |
| 7,308,408 B1 * | 12/2007 | Stifelman et al. ............. 704/266 |
| 7,421,846 B2 * | 9/2008 | Narayanamurthy et al. ..... 62/59 |
| 7,621,142 B2 * | 11/2009 | Hoshi et al. .................... 62/244 |

* cited by examiner

*Primary Examiner* — Mohammad Ali
(74) *Attorney, Agent, or Firm* — Carlson, Gaskey & Olds, PC

(57) ABSTRACT

A cooling system for an aircraft has a refrigerant system to cool a second fluid for a use associated with an aircraft. A valve is operable to route the second fluid to be cooled by the refrigerant under a first set of conditions, and to route the second fluid to be cooled by ambient air from outside of the aircraft under a second set of conditions.

18 Claims, 2 Drawing Sheets

AIRCRAFT SUPPLEMENTAL COOLING SYSTEM

BACKGROUND OF THE INVENTION

The application relates to an aircraft supplemental cooling system, wherein a refrigerant system is powered during low speed operation of a turbine engine, and wherein ambient air is utilized for cooling when the turbine has reached higher speed operation.

Aircraft are typically powered by gas turbine engines. A gas turbine engine provides electrical power and propulsion to an aircraft associated with the gas turbine engine.

Aircraft are typically provided with a number of sub-systems, which utilize the power from the gas turbine engine. As an example, cooling for food is provided by this electrical power. In addition, air conditioning of the cabin air is also provided by this power.

Typically, both of these cooling functions require a compressor, and fans, as are known in standard refrigerant systems. However, the electrical power provided by a gas turbine engine varies in frequency with the speed of the gas turbine engine. To address this issue, sophisticated motor controllers have been proposed to change the frequency of the supplied electrical power supplied to the motors for the compressors and fans. This is somewhat expensive, and thus undesirable.

It is known in the prior art to utilize a small refrigerant system in combination with the cooling ability provided by ambient air to cool electrical controls associated with an aircraft.

SUMMARY OF THE INVENTION

In a disclosed embodiment of this invention, an aircraft cooling system is provided with a refrigerant system, which is utilized during low speed operation to provide cooling for various systems on the aircraft. Once the aircraft has reached higher speed operation, the refrigerant system operation is stopped. Cooling then switches over to the use of the cold ambient air outside of the aircraft.

These and other features of the present invention can be best understood from the following specification and drawings, the following of which is a brief description.

DETAILED DESCRIPTION OF THE PREFERRED EMBODIMENT

Figure 1:
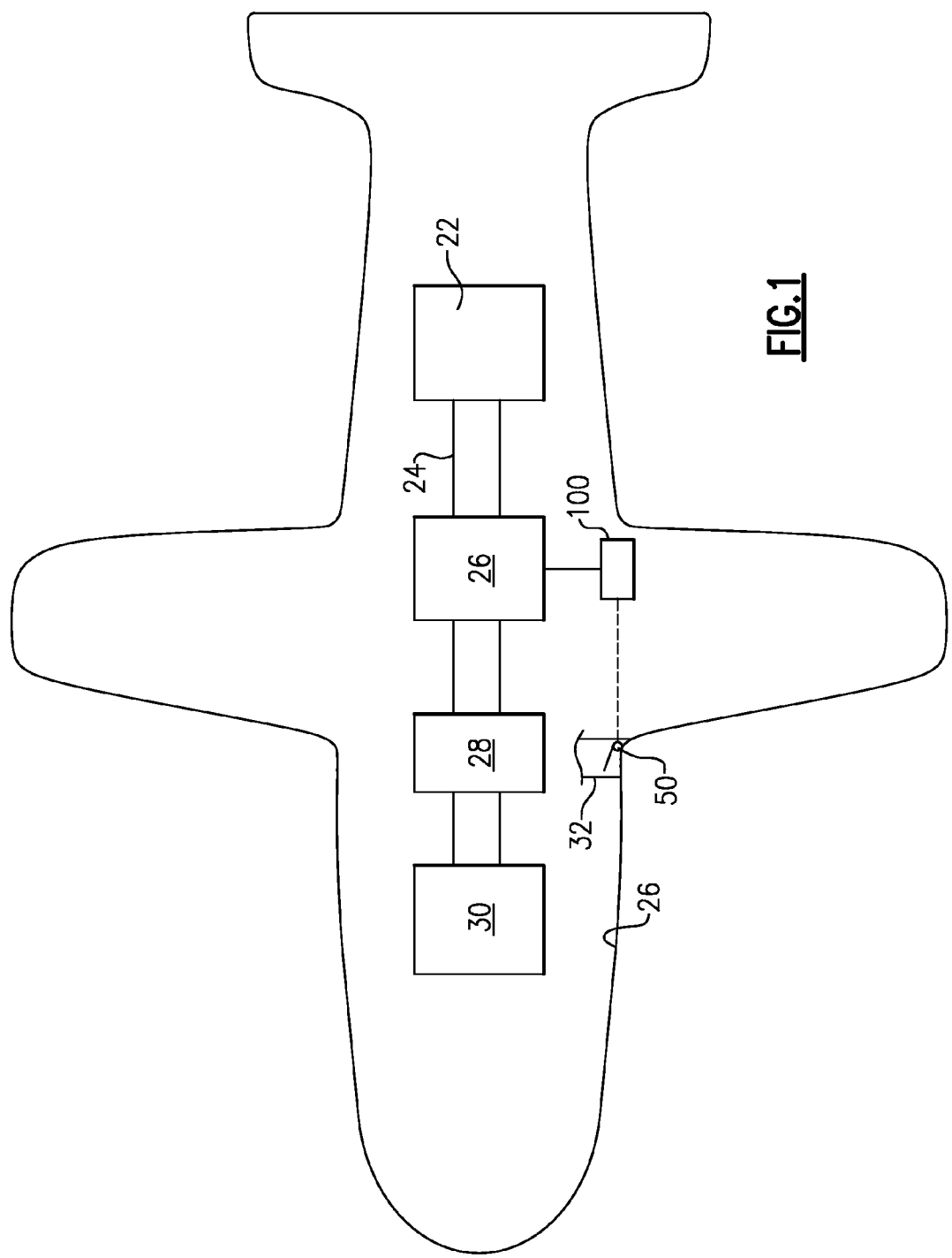
FIG. 1 is a highly schematic view of an aircraft provided with the present invention.

An aircraft 20 is illustrated in FIG. 1 having a gas turbine engine 22 providing electrical power on a bus 24 to a refrigerant system 26. Typically, refrigerant system 26 includes a number of electrically driven components, such as a compressor, fan motors, etc. It is also, of course, known that many other systems on the aircraft will utilize power from the electrical bus 24.

The refrigerant system 26 sends refrigerant into a heat exchanger 28 at which it will receive heat from another use 30, cooling a fluid for the use 30. The use 30 may be the galley, or may be utilized to cool air being directed into the cabin of the aircraft, or may be utilized for other cooling functions. As shown in FIG. 1, a cooling air duct 32 supplies cold air from outwardly of the aircraft 20 under a first set of conditions. A control 100, which may be part of an overall control for many other systems on the aircraft, is shown connected to the refrigerant system 26, and to a gate 50 associated with the duct 32.

Figure 2:
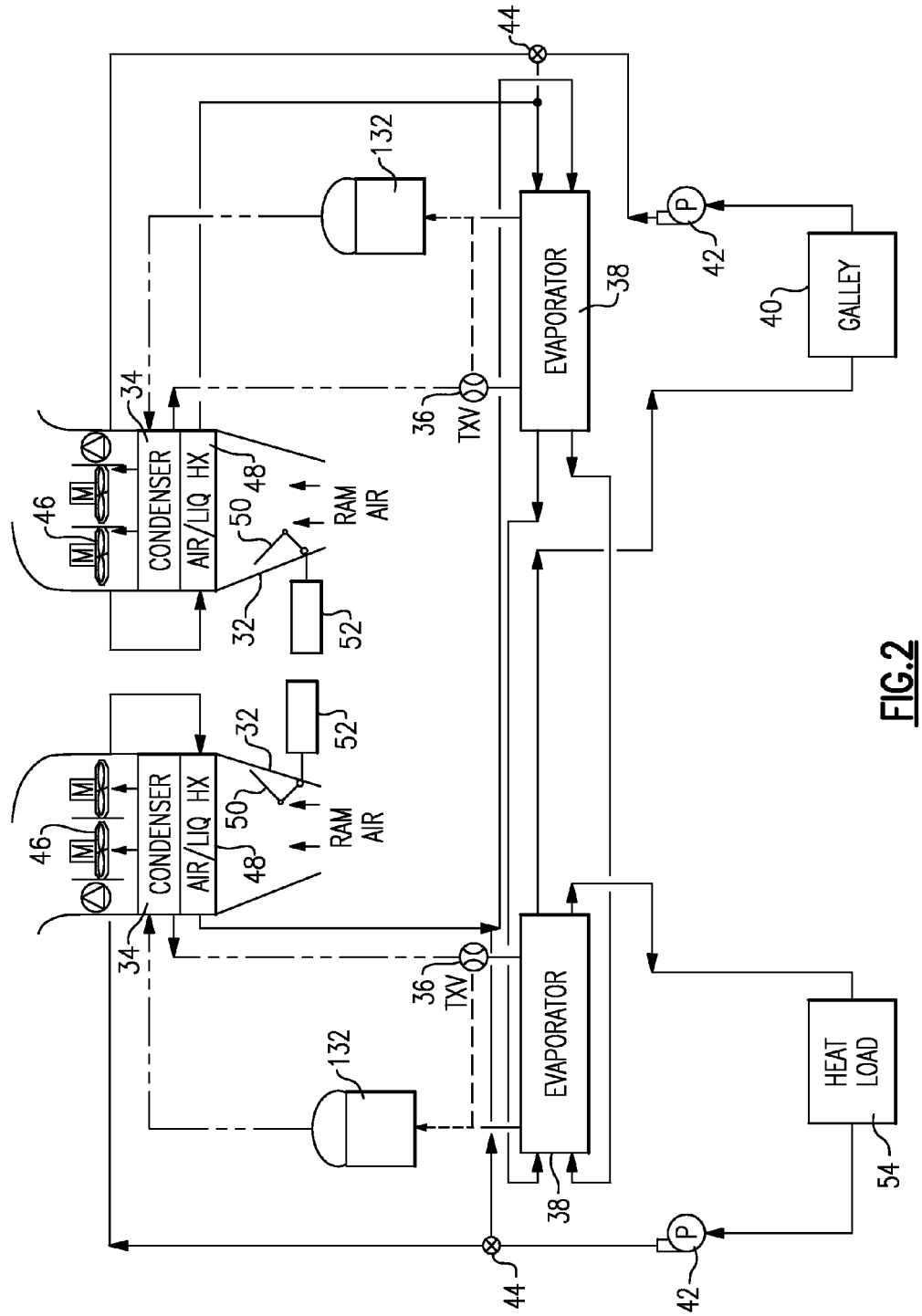
FIG. 2 is a schematic view of a pair of cooling systems associated with the aircraft.

As shown in FIG. 2, the refrigerant systems each include a compressor 132 compressing a refrigerant and delivering it to a condenser 34. In condenser 34, the refrigerant is cooled by fans 46 pulling air over the condenser. The refrigerant passes from the condenser 34 though an expansion device 36 and into an evaporator 38. As known, the evaporator 38 is utilized to cool a secondary fluid. Here, a galley 40, which may be utilized to store food routes its fluid refrigerant through a pair of evaporators 38. The fluid is pumped by pumps 42, and can be air, or any other fluid that is adequate to cool the galley.

Similarly, the heat load 54 for supplying cool air into the cabin of the aircraft may also route some fluid, which may be air, by pumps 42, and then through the evaporators 38. The air may be recirculated, as is known.

The description of the system to this point is generally as currently known in the art of cooling systems on an aircraft. The prior art required electrical power for the compressor, and the several fans or pumps. Typically, the speed of the gas turbine engine will vary during operation of the aircraft. Before the engines are started, an auxiliary power unit (APU) is typically utilized. The APU supplies electrical power for providing the cooling functions above, and for other functions, until the power can be supplied by the gas turbine engines.

Further, during taxi or idle conditions, the power supplied by the gas turbine engine would be a relatively predictable frequency. Thus, the motors for the compressors, and the remaining refrigerant systems, do not need a sophisticated control to change the frequency.

As the engine begins take-off and climbs to its flight levels, the speed of the gas turbine engine would increase dramatically, and the frequency supplied to the bus 24 will also vary. In the past, it is these conditions which have required the sophisticated electrical controls for the motors.

The present invention utilizes the control 100 to stop operation of the refrigerant systems during take-off and flight conditions. Instead, during take-off, the cooling sink of the evaporators 38 is relied upon to continue to cool the systems 40 and 54. Since this is a short transient period, the lack of additional cooling capacity supplied to the evaporators should not present a problem.

Once the aircraft has reached its steady-state flight condition, the gates 50 may be opened. The air outside the aircraft will be extremely cold. The ram air supplied through the ducts 32 passes across air liquid heat exchangers 48. At this time, the valves 44 are switched such that the fluid from the heat load 54 and the galley 40, is no longer directed to the evaporators 38. Instead, this fluid is passed through the air liquid heat exchangers 48. The fluid will be cooled by the ram air.

The present invention thus supplies a simple system which eliminates the need for complex electrical controls to change the frequency of power supplied by a gas turbine engine on an aircraft.

Since the air liquid heat exchanger 48 is associated with a condenser 34, the supplemental cooling system does not require there to be distinct fans or even an additional duct 46 to drive air over the air liquid heat exchanger.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A cooling system for an aircraft comprising:
 a refrigerant system, said refrigerant system being operable to direct refrigerant through a first heat exchanger to cool a second fluid;
 a use to be associated with an aircraft, said use circulating the second fluid through the first heat exchanger to be cooled;
 a control for controlling the refrigerant system, and for controlling a valve, said valve being operable to route the second fluid into the first heat exchanger during a first set of conditions, and to route the second fluid through a second heat exchanger under a second set of conditions, and ambient air from outside of the aircraft which is to receive the cooling system being directed over the second heat exchanger under said second set of conditions to cool the second fluid; and
 said second heat exchanger being associated with a condenser downstream of a compressor in the refrigerant system: and the control controls the refrigerant system to operate the refrigerant system under said first set of conditions, and to stop operation of the refrigerant system under second set of conditions.

2. The aircraft cooling system as set forth in claim 1, wherein the use includes a galley to be associated with the aircraft.

3. The aircraft cooling system as set forth in claim 1, wherein the use is to cool air to be directed into a cabin for the aircraft receiving the cooling system.

4. The aircraft cooling system as set forth in claim 1, wherein said condenser and said second heat exchanger are both positioned such that a fan for moving the air over at least the condenser would also move air over the second heat exchanger.

5. The aircraft cooling system as set forth in claim 1, wherein said second heat exchanger and said condenser are positioned in a common duct which may be exposed to air from outside of the aircraft.

6. A cooling system for an aircraft comprising:
 a refrigerant system, said refrigerant system being operable to direct refrigerant through a first heat exchanger to cool a second fluid;
 a use to be associated with an aircraft, said use circulating the second fluid through the first heat exchanger to be cooled;
 a control for controlling the refrigerant system, and for controlling a valve, said valve being operable to route the second fluid into the first heat exchanger during a first set of conditions, and to route the second fluid through a second heat exchanger under a second set of conditions, and ambient air from outside of the aircraft which is to receive the cooling system being directed over the second heat exchanger under said second set of conditions to cool the second fluid; and
 the control controls the refrigerant system to operate the refrigerant system under said first set of conditions, and to stop operation of the refrigerant system under said second set of conditions.

7. The aircraft cooling system as set forth in claim 6, wherein the control also opens a gate to pull ambient air over the second heat exchanger under said second set of conditions.

8. The aircraft cooling system as set forth in claim 7, wherein said a first set of conditions includes when the aircraft is powered by an auxiliary power unit, taxi condition, and when an engine associated with the aircraft is at idle.

9. The aircraft cooling system as set forth in claim 8, wherein said second set of conditions include flight operation at a flight level.

10. The aircraft cooling system as set forth in claim 9, wherein the second fluid is not cooled by either ambient air or the refrigerant system during at least some portion of take-off and climb of the aircraft receiving the cooling system.

11. A method for operating a cooling system for an aircraft including the steps of:
 directing refrigerant through a first heat exchanger to cool a second fluid;
 a use to be associated with an aircraft circulating the second fluid through the first heat exchanger to be cooled;
 controlling a valve to route the second fluid into the first heat exchanger during a first set of conditions, and to route the second fluid through a second heat exchanger under a second set of conditions, and ambient air from outside of the aircraft being directed over the second heat exchanger under said second set of conditions to cool the second fluid; and
 controlling the refrigerant system to operate the refrigerant system under said first set of conditions, and stopping operation of the refrigerant system under said second set of conditions.

12. The method as set forth in claim 11, wherein said second heat exchanger is associated with a condenser downstream of a compressor in the refrigerant system.

13. The method as set forth in claim 11, wherein the use includes a galley associated with the aircraft.

14. The method as set forth in claim 11, wherein the use is directing cool air into a cabin for the aircraft.

15. The method as set forth in claim 11, wherein the control opens a gate to pull ambient air over the second heat exchanger under said second set of conditions.

16. The method as set forth in claim 15, wherein said first set of conditions include when the aircraft is powered by an auxiliary power unit, taxi, and when an engine associated with the aircraft is at idle.

17. The method as set forth in claim 16, wherein said second set of conditions include flight operation at flight level.

18. The method as set forth in claim 17, wherein the second fluid is not cooled by either ambient air or the refrigerant system during at least some portion of take-off and climb of the aircraft receiving the cooling system.

* * * * *